United States Patent [19]

Du et al.

[11] Patent Number: 6,041,306
[45] Date of Patent: Mar. 21, 2000

[54] SYSTEM AND METHOD FOR PERFORMING FLEXIBLE WORKFLOW PROCESS EXECUTION IN A DISTRIBUTED WORKFLOW MANAGEMENT SYSTEM

[75] Inventors: Weimin Du, San Jose; James W. Davis; Clemens Pfeifer, both of Sunnyvale; Ming-Chien Shan, Saratoga; Nicolas Sheard, Palo Alto, all of Calif.

[73] Assignee: Hewlett-Packard Company, Palo Alto, Calif.

[21] Appl. No.: 08/821,940

[22] Filed: Mar. 21, 1997

Related U.S. Application Data

[60] Provisional application No. 60/032,567, Dec. 5, 1996.
[51] Int. Cl.[7] .................................................. G06F 9/40
[52] U.S. Cl. ............................... 705/8; 705/7; 705/8
[58] Field of Search .................. 705/8, 7, 9; 395/200.31, 395/200.32, 200.33, 182.13

[56] References Cited

U.S. PATENT DOCUMENTS

| | | | |
|---|---|---|---|
| 5,301,320 | 4/1994 | McAtee et al. | 705/9 |
| 5,581,691 | 12/1996 | Hsu et al. | 395/182.13 |
| 5,745,901 | 4/1998 | Entner et al. | 707/103 |
| 5,799,297 | 8/1998 | Goodridge et al. | 707/1 |
| 5,867,824 | 2/1999 | Saito et al. | 705/9 |

OTHER PUBLICATIONS

Hollingsworth, "Workflow Management Coalition", pp. 1–55, Jan. 19, 1995.

*Primary Examiner*—Tod R. Swann
*Assistant Examiner*—Matthew Smithers
*Attorney, Agent, or Firm*—Thomas X. Li

[57] ABSTRACT

A system and method for performing flexible workflow process execution in a distributed workflow management system is described. The distributed workflow management system is formed by a computer network comprising a plurality of computers. Each computer has a processor, memory and input/output facilities. A workflow process management system operates on one or more of the computers to control the computer network in executing the workflow process. The workflow process includes at least one sequence of multiple actions. A plurality of resources is coupled to respective ones of the computers to carry out the multiple actions. A plurality of state machines are stored as computer-operable code in at least one memory and include a plurality of states interconnected by arcs logically forming a directed graph. The workflow management system further includes logic for instantiating each action with one state and logic for executing the logical sequence of the action as state transitions in each state machine.

7 Claims, 10 Drawing Sheets

SYSTEM AND METHOD FOR PERFORMING FLEXIBLE WORKFLOW PROCESS EXECUTION IN A DISTRIBUTED WORKFLOW MANAGEMENT SYSTEM

CROSS-REFERENCE TO RELATED APPLICATION

The present patent application is a continuation application of provisional application No. 60/032,567, filed Dec. 5, 1996, by Weimin Du et.al., and entitled WORKFLOW/PROCESS FLOW PROCESS MANAGEMENT SYSTEM, the disclosure of which is incorporated herein by reference.

This patent application is also related to a commonly-assigned patent application Ser. No. 08/768,261, filed on Dec. 17, 1996, U.S. Pat. No. 5,826,239 and entitled DISTRIBUTED WORKFLOW RESOURCE MANAGEMENT SYSTEM AND METHOD.

BACKGROUND OF THE INVENTION

The present invention relates to the field of workflow process management and more particularly to a system and method for performing flexible workflow process execution in a distributed workflow management system.

Workflow process re-engineering, that is, the fundamental rethinking and re-implementation of workflow processes to achieve never-before-possible levels of quality, cost, throughput and service, is emerging as one of the crucial business strategies of the 1990s. The need for re-engineering is especially significant in an era of workforce downsizing coupled with greater demands for shortened time to market and faster customer response. Moreover, the need is pervasive. Organizations are currently engaging in workflow process re-engineering in many domains, including financial services, telecommunications services, healthcare services, customer order fulfillment, manufacturing procedure automation and electronic commerce.

While workflow process re-engineering provides a business management concept, workflow process management (WFPM) software—or more accurately, middleware—provides the enabling technologies for actually performing workflow process re-engineering. WFPM supports flexible solutions for the management of enterprise-wide operations, including workflow process control, automation and monitoring; resource allocation, authorization and authentication; task initialization and data exchange; and end-to-end communication and security. However, while WFPM offers an overall environment and approach to unifying, automating and measuring workflow processes, it is not limited to supporting workflow process re-engineering and can be used to manage existing nonautomated legacy or work processes.

In general, WFPM systems perform a wide range of tasks. For instance, they can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Moreover, given the trend towards open systems and standards, a WFPM system must coexist with and take advantage of standards-based commercial products for network communication, legacy application invocation and system monitoring. In particular, these standards include the Object Management Group's Common Object Request Broker Architecture (CORBA), the Open Software Foundation's Distributed Computing Environment (OSF DCE), Hewlett Packard's OpenView and the International Standards Organization Open Systems Interconnection (ISO OSI) X.400 technologies.

Workflow process execution should be correct, efficient and flexible. Flexible execution of workflow processes is important in a dynamic workflow environment. For example, a workflow process might need to be modified after being started. A resource manager might not be able to find resources for the workflow activities and a workflow assigned to an activity might not be able to perform the assigned task. A WFPM system must be flexible enough to cope with these situations to provide correct and efficient workflow process execution.

Existing workflow products adopt a centralized process execution strategy which requires all workflows to be registered with the WFPM system before use. The relationships between WFPM systems and resource managers, that is, built-in resource managers, and between workflow activities and resources specified at process definition time are static. Thus, the process execution is inefficient, as some resource managers and workflows might be heavily loaded while others remain idle. The approach is also inflexible, as it is difficult to change resource manager and workflow at runtime, particularly during resource assignment or application execution processing.

Therefore, what is needed is a flexible and preferably decentralized WFPM system able to dynamically redefine the relationships between the WFPM system and resource managers.

There is a further need for a flexible WFPM system capable of dynamically redefining workflow activity and resource definitions to efficiently perform process execution. Such a WFPM system would preferably balance the distribution of such process execution between resource managers and workflows to minimize overloading and idle time.

There is still a further need for a flexible WFPM system capable of dynamically change resource assignments and application execution processing to resource managers and workflows at runtime.

SUMMARY OF THE INVENTION

The present invention provides a system and method for performing flexible workflow process execution in a distributed workflow management system. It is an object of the present invention to provide process execution techniques for allowing flexible process instantiation, resource assignment and application execution.

An embodiment of the present invention is a system and method for performing flexible workflow process execution in a distributed workflow management system. The distributed workflow management system is formed by a computer network comprising a plurality of computers. Each computer has a processor, memory and input/output facilities. A workflow process management system operates on one or more of the computers to control the computer network in executing the workflow process. The workflow process includes at least one sequence of multiple actions. A plurality of resources is coupled to respective ones of the computers to carry out the multiple actions. A plurality of state machines are stored as computer-operable code in at least one memory and include a plurality of states interconnected by arcs logically forming a directed graph. The workflow management system further includes logic for instantiating each action with one state and logic for executing the logical sequence of the action as state transitions in each state machine.

The foregoing and other objects, features and advantages of the invention will become more readily apparent from the following detailed description of a preferred embodiment of the invention which proceeds with reference to the accompanying drawings.

DETAILED DESCRIPTION

Workflow Process Management System

Figure 1:
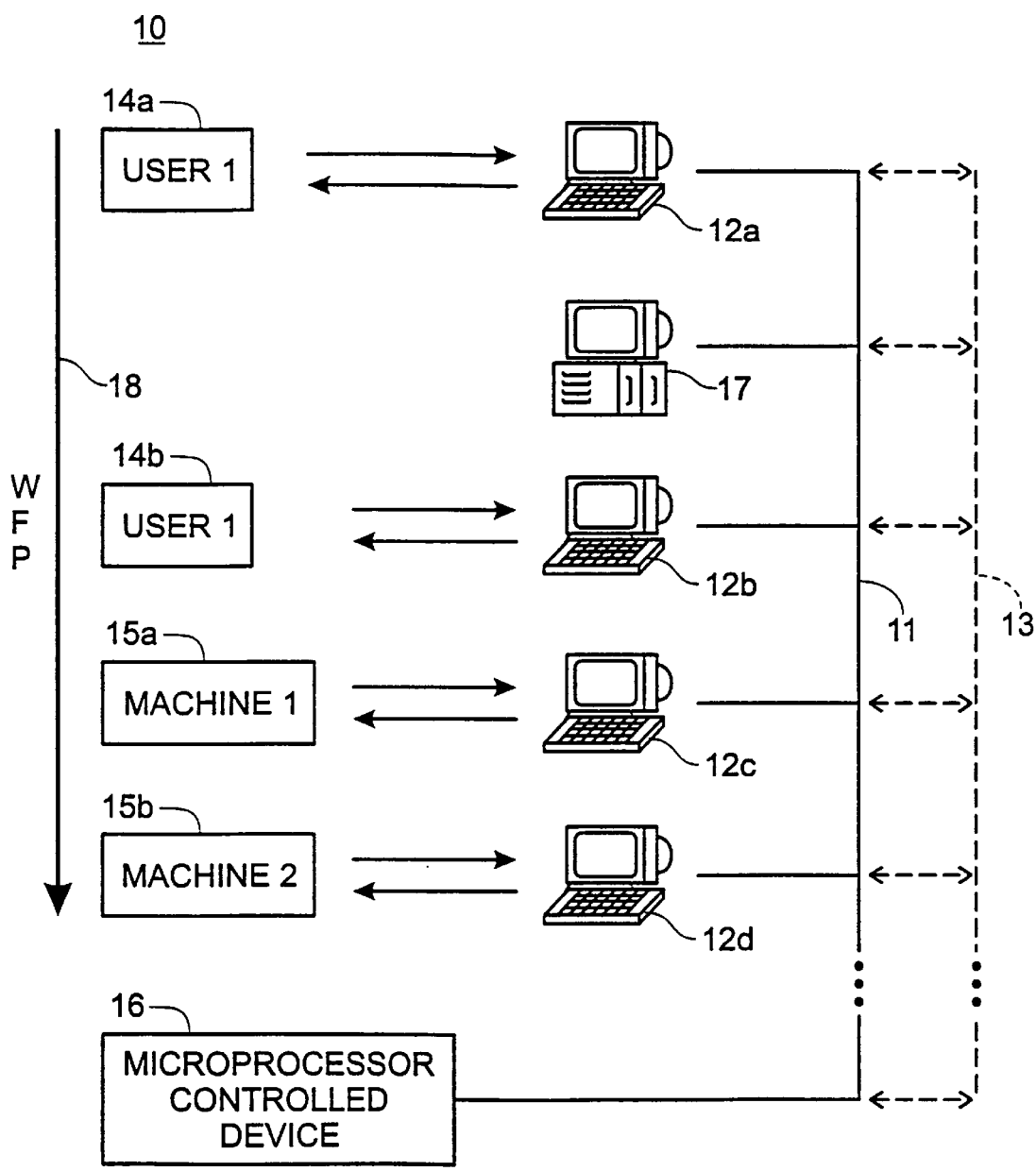
FIG. 1 is a block diagram of a process flow management system implemented in a network of computers coupled to a plurality of users and machines for management and control of workflow process activities performed by the users and machines.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d. The computer systems 12a–d and centralized WFPM server 17 conventionally include a processor, memory and input/output interface including network communications facilities and user input and output devices.

Each workflow process 18 includes a sequence of activities, each of which is ordinarily performed by one of the computer systems 12a–d in conjunction with an associated user 14a–b or machine 15a–b, although some activities can be performed by microprocessor-controlled devices 16 (one such device shown in FIG. 1, although multiple devices can be used), such as a telephone or facsimile machine, printing device or similar self-controlling mechanism. In addition, each machine 15a–b can be a work instrument or computer resource.

The workflow process 18 can span several business organizations (only one organization is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (examples shown in FIG. 3 and FIG. 7) which provides the operational "glue" and environment support needed by the WFPM system 10 for managing and automating the workflow processes 18, recovering from failures and enforcing consistency. As further described hereinbelow, the WFPM system 10 also enforces various administrative policies associated with resources and work.

The specific structure and flow of each workflow process 18 managed by the WFPM system 10 can be preplanned or developed in an ad hoc fashion. For example, in a WFPM system 10 used for managing the workflow process 18 of providing telecommunications services, some aspects of the workflow process 18 are determined ad hoc and depend in part on the services required by each individual customer. However, other aspects of the workflow process 18 can be preplanned and deliberately structured. For instance, independent from the individual services required by a single customer, the workflow process 18 always originates in the sales department and typically ends in the billing department. The parts of the workflow process 18 involving these departments can be preplanned.

HP OpenPM

Figure 2:
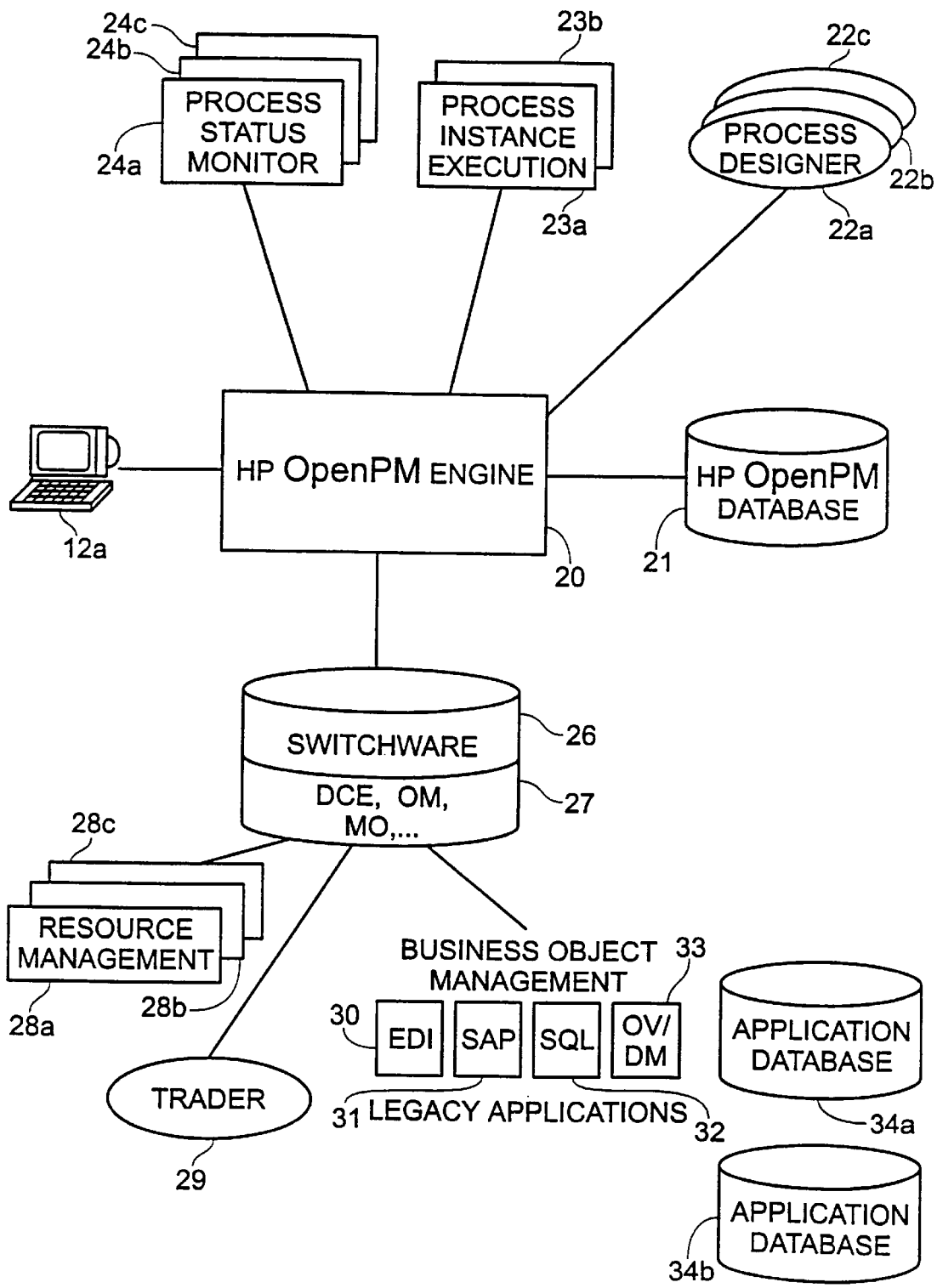
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WPFM middleware employing the present invention. An example of middleware suitable for implementing the present invention is the Hewlett Packard (HP) OpenPM system. HP OpenPM is an open, enterprise-capable, object-oriented WFPM system developed at Hewlett Packard Laboratories, Palo Alto, Calif., for managing process activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

Briefly, HP OpenPM provides an open system with a Workflow Management Coalition-standard interface. Second, it offers high performance as a result of optimized database access and commitment features. It also provides effective management when coupled with an HP OpenView-based system management environment. Finally, HP OpenPM presents a comprehensive solution for business re-engineering, including an extensive set of products.

The overall architecture of the HP OpenPM system is depicted in FIG. 2. The core is the HP OpenPM engine 20, which supports five interfaces. The interfaces enable the HP OpenPM engine 20 to interact with workflow process designer 22a-c, workflow process instance execution 23a-b, workflow process monitor 24a-c, workflow management 28a-c and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

A workflow process 18 is specified by the process design modules 22a-c via the workflow process definition interface. An instance of a workflow process 18 can be started, controlled or stopped by the process instance execution modules 23a-b via the process execution interface. Status information of each process instance and load information for the WFPM system 10 can be queried using the process status monitor modules 24a-c via the process status monitoring interface. The workflow management interface is used to allocate, at run time, execution resources to a task, according to the policies defined by the organization (including authorization and authentication) and the availability of the resources using the workflow management modules 28a-c. Interaction with the external world, such as invoking an application, controlling an instrument or delivering a work order to a person's electronic mail in-box, is performed by the various business object management modules 30, 31, 32, 33.

HP OpenPM Process Model

Figure 3:
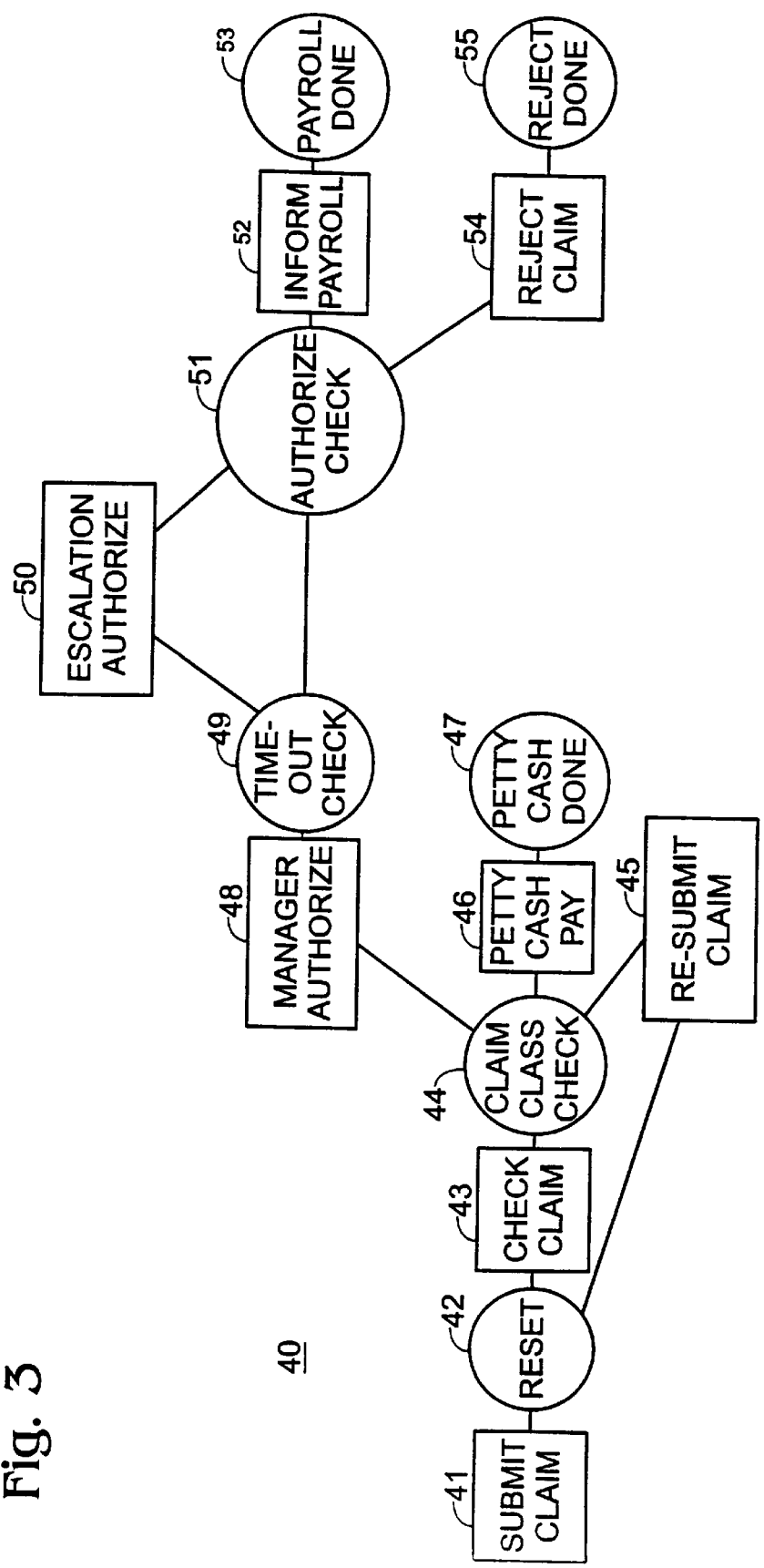
FIG. 3 is a computer display of the user interface for the user of the machine of FIG. 2 to interact with the process flow management system, the display showing an example of a process flow diagram for a business process flow managed by the system.

In general, a workflow process 18 is a description of the sequencing, timing, dependency, data, physical agent allocation, business rule and organization policy enforcement requirements of process activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the forward execution flow of process activities and form a directed acyclic graph 40. Successful completion of a node at the source end of a forward arc triggers the starting of the node at the destination end of the forward arc.

Reset arcs are used to support repetitions or explore alternatives in a workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects and provision of input data for the business objects and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of a process 18. A process activity is mapped to the invocation of an operation on business objects during the execution of the process and each process activity can represent a manual operation by a human or a computerizable task to execute legacy applications 30, 31, 32, 33 (shown in FIG. 2), access application databases 34a, 34b (also shown in FIG. 2), control instrumentation, sense events in the external world or effect physical changes. A process activity definition includes a forward activity and optionally, a compensation activity, a cancel activity, a workflow management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to active and performs or requests its associated activity. When the inward arc is fired on a work node 41 in a state other than the initial state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process 18, there is a process data template defined by a workflow process designer module 22a (shown in FIG. 2). The process data template is used to provide initial data for the creation of process instances. At run time, based on the process data template and read/write lists of activities defined in a workflow process 18, HP OpenPM will generate a case packet for each process instance to facilitate data passing between activities and the HP OpenPM engine 20.

HP OpenPM Process Execution

Figure 4:
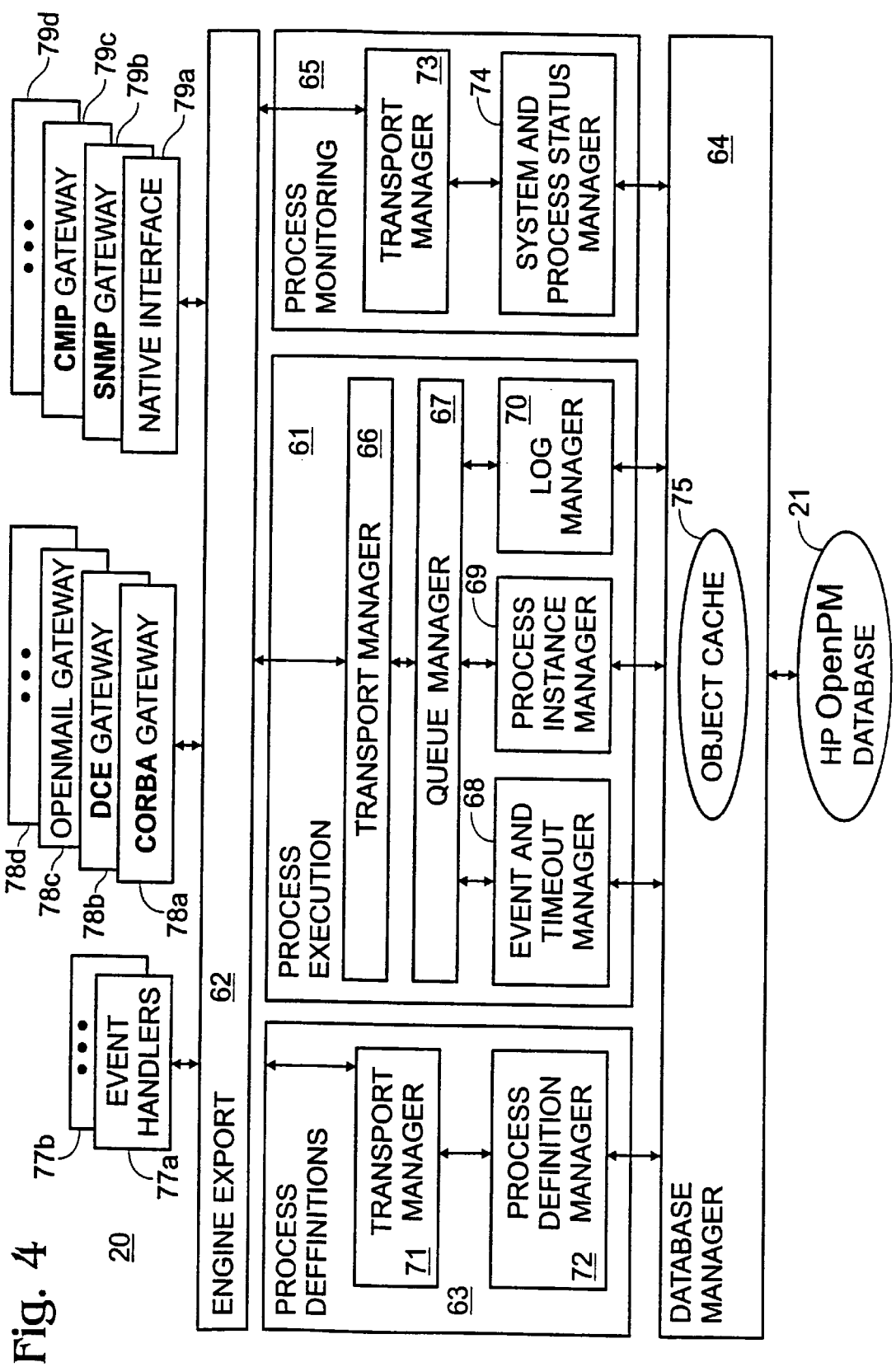
FIG. 4 is a block diagram of the preferred form of workflow process software engine that coordinates execution flow of the managed process.

FIG. 4 is a block diagram of the preferred form of a workflow process software engine, such as the HP Open PM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 (examples shown in FIG. 3 and FIG. 7) according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a process activity failure. In addition, the HP OpenPM engine 20 allows flexible specification of compensation scopes and actions, such as compensation activity or cancel activity to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running process activities and support system management, the HP OpenPM engine 20 maintains a comprehensive log of all events using a log manager 70 and provides a native interface 79a as well as an SNMP 79b and CMIP 79c gateways to facilitate integration with the HP OpenView environment. The formats and contents of the logged information can be customized to support specific application needs.

HP OpenPM Workflow Objects

The HP OpenPM engine 20 has to interact with process activities supported by various implementations encountered in real life. These activities can range from manual handling by users 14a–b to automated processes executed by computers 15a–b. An infrastructure is needed to enable the effective management and invocation of these process activities.

Distributed object technologies have become the primary infrastructure for enterprise-scale distributed computing. Among them, the OMG (Object Management Group) CORBA (Common Object Request Broker Architecture) technology has been developed to support interoperability for application integration.

Based on CORBA technology, in the HP OpenPM engine 20, an abstraction called a business object 93a (shown in FIG. 5) is built to encapsulate whatever piece of work each process activity has to accomplish. The wrapping code provides an IDL (Interface Definition Language) interface. The business objects are catalogued by a database manager 64 in the HP OpenPM business object library in business databases 94a–c (shown in FIG. 5). An object cache 75 is optionally used to optimize business object access.

A business object 93a, as defined by the OMG, is a representation of something active in the business domain, including its business name and definition, attributes, behavior and constraints. It provides a uniform way to encapsulate legacy systems and applications and a direct mapping, in understandable business terms, between the business model and the possibly sophisticated operational procedures of the workflow process system.

By representing these process activities in business objects 93a–c, new workflow processes 18 can be quickly created by assembling business objects 93a–c to describe workflow processes 18. The business object library avoids repetitive coding to tailor the process activity implementation to each individual workflow process 18.

HP OpenPM Resource and Policy Management

A resource is a person, computer process or machine that can be used to accomplish a task. A resource has a name and various attributes defining its characteristics, such as job code, skill set, organization unit and availability.

A policy is a set of rules that determines how resources are related to tasks within a WFPM system 10. One common use is for task assignment. Policies can be used to specify which resource, under which role, is eligible or available to perform a task. Policies are also used to ensure proper authorization and authentication.

In HP OpenPM, the mapping between the process activity (task) specified in a workflow process 18 and the business object (resource) to be invoked is performed by the resource manager 28a (shown in FIG. 2) during run time as part of the execution of the process activity. The HP OpenPM engine 20 allows multiple resource managers 28a–c to be used to resolve a single resource assignment request; each resolves the request at a different level within an organization.

HP OpenPM Worklist and Application Data Handlers

Figure 5:
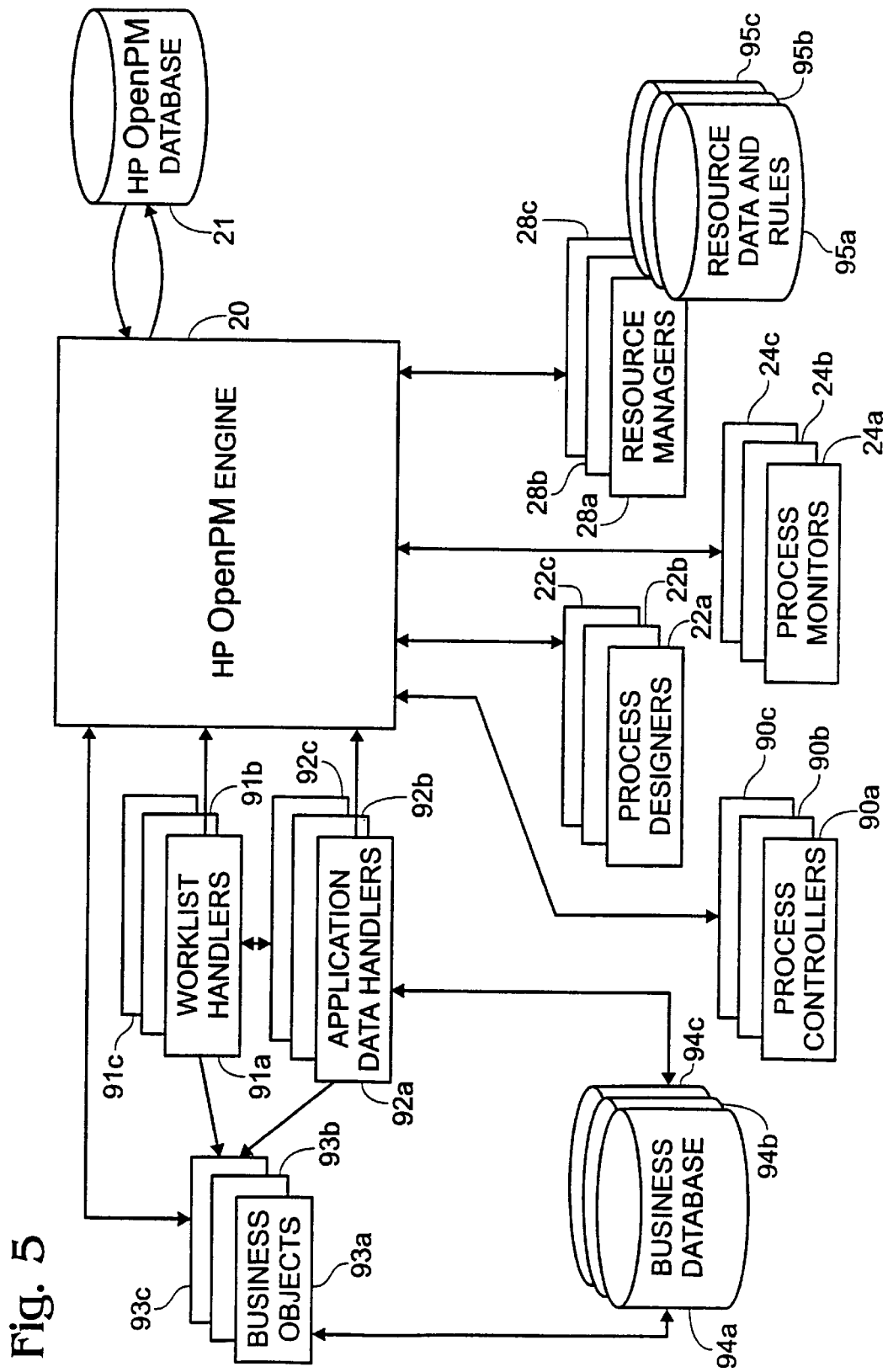
FIG. 5 is a block diagram of the system architecture with optional worklist handler and application data handler features to enhance scalability.

FIG. 5 is a block diagram of the system architecture of FIG. 2 with optional features to enhance scalability of HP OpenPM systems. Two optional components that can be added into the HP OpenPM engine 20 environment to facilitate the execution of workflow processes 18 are worklist handlers 91a–c and application data handlers 92a–c.

The worklist handler 91a supports both engine-push and client-pull modes to provide more freedom in task assignment. In addition, the worklist handler 91a can be used to support the concept of integration on demand. Based on the task performer's profile, the worklist handler 91a determines and launches a specific environment for an activity at run time, rather than hardwiring it into the process definitions.

The application data handler 92a supports the separation of application-specific data and process-relevant data to reduce the amount of data flow over the network. It also provides the preparation facility for application-specific data to remove the burden of database access from activity performers.

HP OpenPM Security

In today's business environments, security must be implemented enterprise-wide. The security service developed by the OMG provides authentication and encryption for the HP OpenPM engine 20 to prevent eavesdropping and forgery. The HP OpenPM engine 20 infrastructure components can identify each other and vouch for the credentials of end-user components.

WFPM in the Telecommunications Management Network

Figure 6:
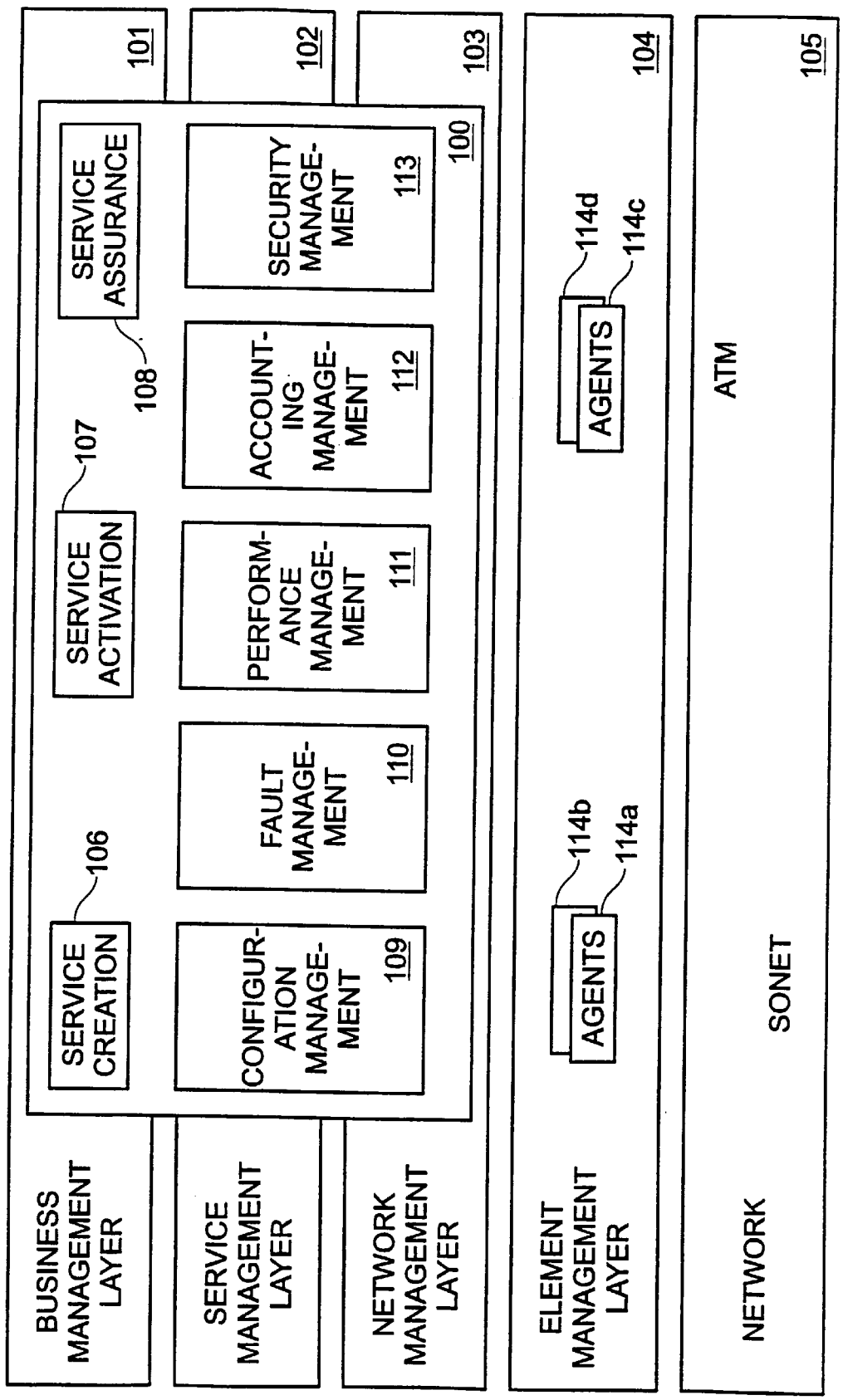
FIG. 6 is a diagram showing management function layers provided by business process flow management using the system of FIGS. 1–5 for the example of management of a telecommunications network.

FIG. 6 is a diagram showing management function layers 101, 102, 103, 104, 105 provided by workflow process management using the system of FIGS. 1–5 for an example of the management of a telecommunications network. The Telecommunications Management Network (TMN) defined by the International Telecommunications Union is changing the way operations support systems and business support systems solutions are being developed. The TMN architecture separates layers of functionality and provides access by elements in any one layer to any element in the layer immediately below, as shown in FIG. 6. Before the introduction of the TMN model, operations support systems and business support systems solutions were isolated from each other and could not interoperate.

The HP OpenView Distributed Management platform supports the realization of TMN operations support systems and business support systems solutions for the TMN element management layer 104 and network management layer 103. However, a middleware service is needed for supporting the service management layer 102 and even the business management layer 101 of the TMN model. The next section presents an example of this support.

At the service management layer 102, the WFPM process enabling framework is required to be able to support re-engineering and transformation processes for strategic operations support systems and business support systems, to integrate existing operational environments to form an enterprise hub for service management and provisioning, deploy new management services as rapidly as possible, to monitor and measure processes, to tune processes to benefit from experience and to automate processes to reduce execution time.

SONET Configuration Management Prototype

Figure 7:
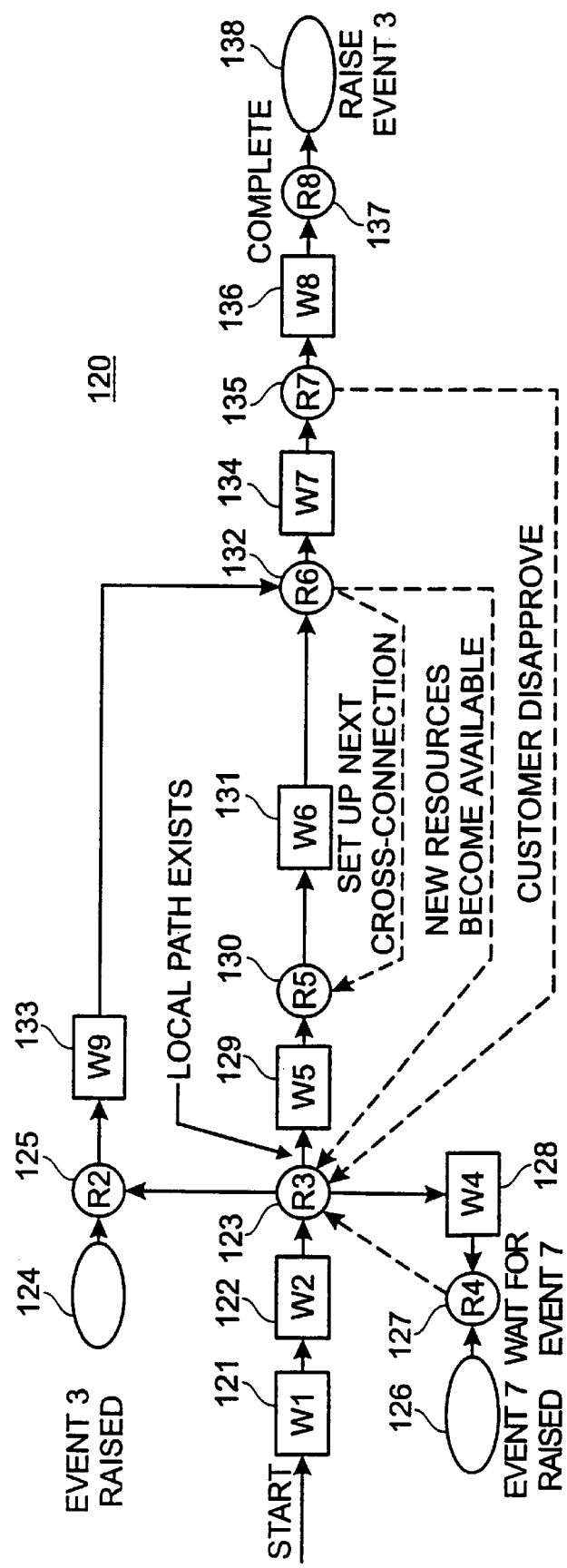
FIG. 7 is a process definition diagram for configuration management of the telecommunications network in the example of FIG. 6.

FIG. 7 is a process definition diagram for configuration management of the telecommunications network in the example of FIG. 6 based on the HP OpenPM system. It depicts a prototype to demonstrate the application of WFPM technology in the specific domain of SONET (Synchronous Optical Network) configuration management. The prototype was a joint project between HP Laboratories in Bristol, England and Palo Alto, Calif. to demonstrate the middleware technologies required to automate the processes supporting the configuration management of a SONET telecommunications network.

The scenario demonstrated by this prototype consists of the provision of a new VC4/VC12 path for customers. It goes through several different steps for this operation: search for a new route, negotiate the service level agreement (SLA) with the customer, configure the new path, and finally, update the SLA for this customer. The HP OpenPM process definition supporting the process of providing this new SONET data path is sketched in FIG. 7 which shows the HP OpenView process definition for SONET configuration management.

Searching for and configuring a new path in SONET are complex processes requiring a lot of interaction with the SONET MIB (Management Information Base) and network elements. This type of operation is a source of errors when it is performed manually by an operator as a set of individual, uncorrelated activities.

In the prototype, such complex operations as searching and configuring new paths are handled as workflow processes 18 and automated by an HP OpenPM engine 20 in an environment interacting with HP OpenView DM and Oracle DBMS applications.

Depending upon the changing business needs, a customer can request to add or drop communication paths between certain endpoints in a private virtual network (PVN). In HP OpenPM, these services can be modeled as workflow processes 18 to be executed by the service provider. Adding a new path may consist of the following activities and decision points:

1. Retrieve the customer's profile from the customer database for customer-PVN-specific information.

2. Locate the closest add-drop multiplexers (ADMs) to the endpoints, based on the information stored in the SONET physical configuration database.

3. Check whether fiber connections exist between the endpoints and the two end-ADMs.

4. If not, issue a request for an engineer to go on-site and physically connect the endpoints to the end-ADMs. After the establishment of the connection, the process continues on to step 5 and an independent subprocess is initiated to watch for resource changes.

5. Find valid routes between end-ADMs. This requires access to the routing table in the SLA database to determine whether any valid routes exist between the two end-ADMs. Either a list of ADMs is returned signifying the ADMs that must be configured to realize the route, or "No Route Found" is returned. For a returned list of ADMs, this activity will then use the HP OpenView DM facility agent to collect port information stored in the MIB to determine the available ports between the ADMs that are fibered together and can be used to enable the path.

6. Check network element (NE) capabilities. For an ADM in the route, this activity uses the HP OpenView DM NE agent to access the MIB information to determine whether a VC4 cross-connection can be set up in the ADM between the selected ports of the ADM. This activity has to be executed for each ADM in the route. During steps 5 and 6, if any additional resources become available, HP OpenPM cancels any currently running activity and starts the process over from step 5 to consider these newly available resources.

7. Get customer's approval of the selected configuration. Once a suitable path is identified, the customer will review the offer, including available date, charges, quality of services (QoS), and so on. Depending upon the business factors (e.g., cheapest service wanted), the customer may request that a new search be initiated, that is, loop back to step 5 to find another valid route.

8. Configure the selected route. This activity is responsible for setting up the cross-connections in each ADM by invoking the HP OpenView DM NE agent and updating the SLA database.

Flexible Workflow Process Execution

Figure 8:
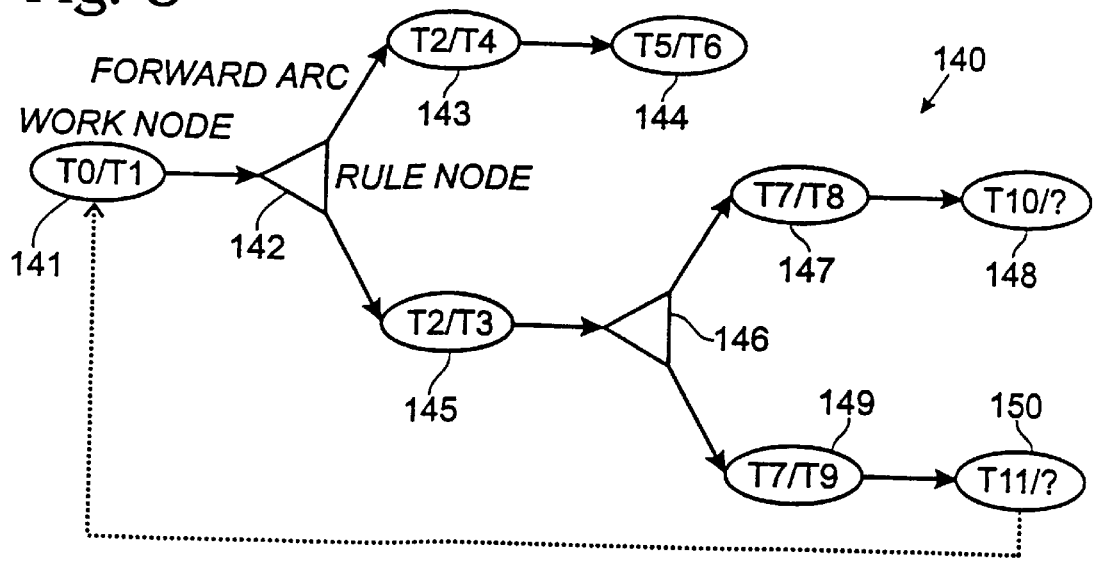
FIG. 8 shows, by way of example, a workflow process specified via the workflow process definition interface using the process design modules shown in FIG. 2.

FIG. 8 shows, by way of example, a workflow process specified via the workflow process definition interface using the process design modules 22a–c shown in FIG. 2. The process definition is specified as a directed graph 140 comprising a set of nodes connected by arcs. Each node is labeled with timestamps indicating relative start and completion times. For example, node 141 has a start time of T0 and a completion time of T1. A question mark indicates the node is still active with an unknown completion time. For example, node 148 has a start time of T10 but has not yet completed.

There are two kinds of nodes: work nodes 141, 142, 144, 145, 147–150 and rule nodes 142, 146. Each work node 141 is a placeholder for a process activity which logically represents a unit of work contributing toward the accomplishment of the overall workflow process. Work nodes 141 also contain position specific information, such as a name and compensation label. As further described below with reference to FIG. 10, the compensation label indicates that the current work node 141 represents a possible consistent execution state and can be used by other work nodes 145 as an end compensation point to which the failed process execution can be rolled back.

Each rule node 142 specifies a process flow which typically goes beyond a simple sequence of steps and involves logic and decision points. A rule language is used to define rule node 142 decisions. When invoked during runtime, the rule node 142 decides which outgoing arcs to fire based upon the status information passed along incoming arcs, the time at which each incoming arc was fired and process-relevant data associated with the process instance. Each rule node 142 can also initiate an event (not shown) when certain conditions, as defined in by the rules, are met. Conversely, an event can activate a rule node 142 that has subscribed to the event.

All arcs are directed and start at a source node and end at a destination node. There are two kinds of arcs: forward arcs and reset arcs. Forward arcs represent the normal execution flow of a workflow process through the directed graph 140. Normally, the workflow moves from a source node 146 upon the completion of its assigned tasks over one or more forward arcs to destination nodes 147, 149 to initiate their assigned tasks. By contrast, reset arcs explore alternatives in a workflow process by creating cycles in the directed graph 140. Thus, the source node of a reset arc, unlike a forward arc, must ultimately be reachable from the reset arc's destination node. For example, work node 150 is connected by a reset arc to work node 141 and is reachable along the path consisting of the forward arcs connecting work node 141, rule node 142, work node 145, work node 149 and work node 150. At runtime, when the reset arc is traversed, all nodes 141, 142, 145, 146, 149, 150 falling within the loop are "reset." A reset changes their respective states to an initial state for re-execution and allows the workflow process to try different alternatives or repeat what has already been done.

The foregoing workflow process definition enables an instance of a workflow process to be flexibly controlled via the process execution interface using the process instance execution modules 23a–b (shown in FIG. 2). Moreover, status information for each process instance and load information for the entire system can also be queried via the process status monitoring interface using the process status monitor modules (shown in FIG. 2).

Workflow Process Execution State Machines

The process instance manager (PIM) and node instance manager (NIM) are the two key modules of the OpenPM engine 20 (shown in FIG. 5). The PIM handles workflow process instance creation and termination which both require access to the HP OpenPM database 21. The NIM handles other operations, such as changing an instance state and suspending and resuming instance execution. In addition, the NIM is subdivided into a work node instance manager (WNIM) and a rule node instance manager (RNIM) modules for respectively managing work and rule nodes. The WNIM executes the associated process activity which may in turn invoke external business objects 93a–c. Also, an activity instance manager (AIM) is used to manage activity execution for the WNIM. The RNIM evaluates each rule nodes's rule specifications using an internal rule engine to perform routing or event actions.

The OpenPM engine 20 functions as a set of efficient and reliable state machines. There is one state machine for each process/work node/rule node/activity instance. Process instance state machines are started and managed by the PIM. Work node instance state machines are started and managed by the NIM. Rule node instance state machines are started and managed by the RNIM. Activity instance state machines are started and managed by the AIM. State machines interact with the other state machines and OpenPM clients via messages. Priority queues which are managed by the queue manager 67 (shown in FIG. 4) are used to facilitate message dispatching between the modules.

Figure 9:
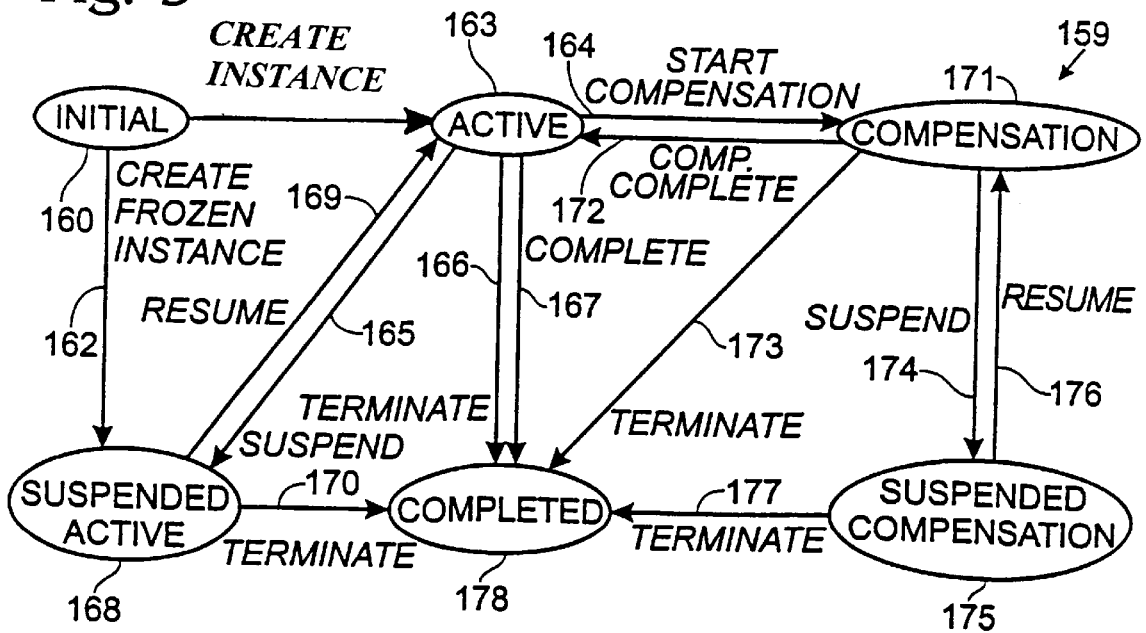
FIG. 9 shows the process state machine for the process instance manager for use with the workflow process software engine of FIG. 4.

Each state machine is described as a connected graph, as shown in FIG. 9 et seq., which consists of a set of states and a set of state transitions interconnecting pairs of states. Each state has zero or more incoming transitions. Each state also has zero or more outgoing transitions. Each state transition is labeled with a request.

The flow control of each state machine always begins in a state designated as the initial (quescent for AIM) state. Thereafter, each time the state machine enters a new state, it performs some action, such as queuing a request for other state machines or OpenPM clients. Also, at each subsequent state, the state machine checks the priority queue for requests. If a request is pending, the state machine dequeues the first request and checks the request against its state machine definition to determine whether there is an outgoing transition from the state labeled with the dequeued request. If such an outgoing transition is found, the state machine transitions to the next state following the outgoing transition with a label matching the dequeued request. Otherwise, the state machine ignores the request and remains in the current state.

The subsequent sections describe the state machines for the PIM, WNIM, RNIM and AIM, respectively.

Process Instance State Machine

FIG. 9 shows the process state machine 159 for the PIM for use with the workflow process software engine of FIG. 4. The process state machine 159 has six states, divided into four regular execution states: Initial 160, Active 163, Completed 178 and Compensation 171; and two suspended execution states: Suspended Active 168 and Suspended Compensation 175. The states are interconnected with directed arcs, each arc labeled with the message passed from the source state to the destination state.

A process instance is initially created in the Initial state 160 and via a Create Frozen Instance arc 162 becomes a suspended instance in the Suspended Active state 168 or via a Create Instance arc becomes an active instance in the Active state 163. The process instance thereafter becomes via a Resume arc 169 an active instance in the Active state 163 once the PIM activates its start nodes 141 by traversing their inward arcs. During execution, a process instance in the Active state 163 or Compensation state 171 can become suspended by respectively entering the Suspended Active 168 via a Suspend arc 165 or the Suspended Compensation 175 state via a Suspend arc 174. While suspended, a process instance in the Suspended Active state 168 or the Suspended Compensation state 175 can be resumed by respectively entering the Active state 163 via a Resume arc 169 or the Compensation state 171 via a Resume arc 176. A process instance in the Active state 163 can be compensated by entering the Compensation state 171 via a Start Compensation arc 164. Similarly, a process instance in the Compensation state 171 can resume active execution by entering the Active state 163 via a Compensation Complete arc 172. The execution of a process instance is complete if: (1) all work nodes are either in Initial 180 (shown in FIG. 10) (never activated) or Completed 203 (shown in FIG. 10) states; or (2) the process instance has been explicitly terminated, such as by the user. A completed process instance in the Active state 163 can enter the Completed state 178 via a Complete arc 167. A process instance can be terminated from any state, except the Initial state 160, by entering the Completed state 178 via a Terminate arc 166, 170, 173, 177.

To create a new process instance, a user needs to provide: (1) the ID of the process; and (2) initial data needed for process routing. In the described embodiment, this data is referred to as process relevant data in keeping with the definition provided by the Workflow Management Coalition. There are also application-specific data items used by external applications which are not visible to the OpenPM engine 20. A data structure (not shown), known as a case packet, stores the process relevant data.

To create a process instance, the PIM performs the following steps:

(1) gets the process definition, including the process data template, from the OpenPM database 21 (shown in FIG. 2) using the provided process ID;

(2) allocates a new process instance ID and logs it into the system log file;

(3) fills in the process data template with the provided process relevant data user has provided and writes the template into the database 21 as the initial case packet;

(4) updates the process instance table (not shown) to reflect the new instance in the Suspended Active state 168;

(5) creates node and arc instances of the process;

(6) sends a message to the NIM to change the process instance to the Active state 163 and return the instance ID to the client; and (7) sends messages to the NIM to traverse the inward arcs for each of the start nodes of the process instance.

In step (5), creating node and arc process instances can be performed at three levels of detail, referred to as immediate, lazy and hybrid instantiation. At the most detailed level, immediate instantiation exhaustively creates all specified process node and arc instances when the process instance is created. This approach is easy to implement and facilitates the runtime modification of the process instances without having to change the original process definition. However, immediate instantiation can create node and arc instances that are never activated.

At the least detailed level, lazy instantiation creates each process node and arc instance only when it is actually needed during the execution of the process instance. This approach avoids creating node and arc instances that are never executed and reduces database overhead. However, lazy instantiation makes ad hoc process instance modifications at runtime difficult because all of the nodes and arcs have not been instantiated.

At an intermediate level of detail, hybrid instantiation begins by creating only necessary node and arc instances. However, if the process instance needs to be changed, all node and arc instances that have not yet been instantiated and are reachable from currently activated nodes which have started but not yet completed are created. This approach not only supports ad hoc process instance modification, but also delays the instantiation of nodes and arcs until the process instance is being modified. Hybrid instantiation also avoids unnecessarily creating nodes and arcs that are not reachable from the currently activated nodes.

A process instance automatically completes when all work nodes are either in the Initial 180 (shown in FIG. 10) or Completed 203 (shown in FIG. 10) states or can be either manually terminated by a user. When a process instance automatically completes execution, the PIM simply changes its state to the Completed 178 state. To terminate a process instance manually, a user provides the process instance ID to the PIM. In response, the PIM performs the following steps:

(1) Cancels and terminates all activated but not completed work nodes of the process instance; and (2) Changes the instance state to the Completed 178 state by sending a message to the NIM.

Whenever the execution of a process instance fails at one of its work nodes, due to, for example, a timeout or execution failure, the process instance must be compensated. In response, the PIM performs the following steps:

(1) saves all currently active work nodes 141; and (2) sends a message and relevant information to the compensation manager.

The compensation manager replies to the PIM when it finishes compensation and the PIM will then resume the execution of the process instance from all active nodes not inside the compensation scope and the specified end compensation point.

Work Node Instance State Machine

Figure 10:
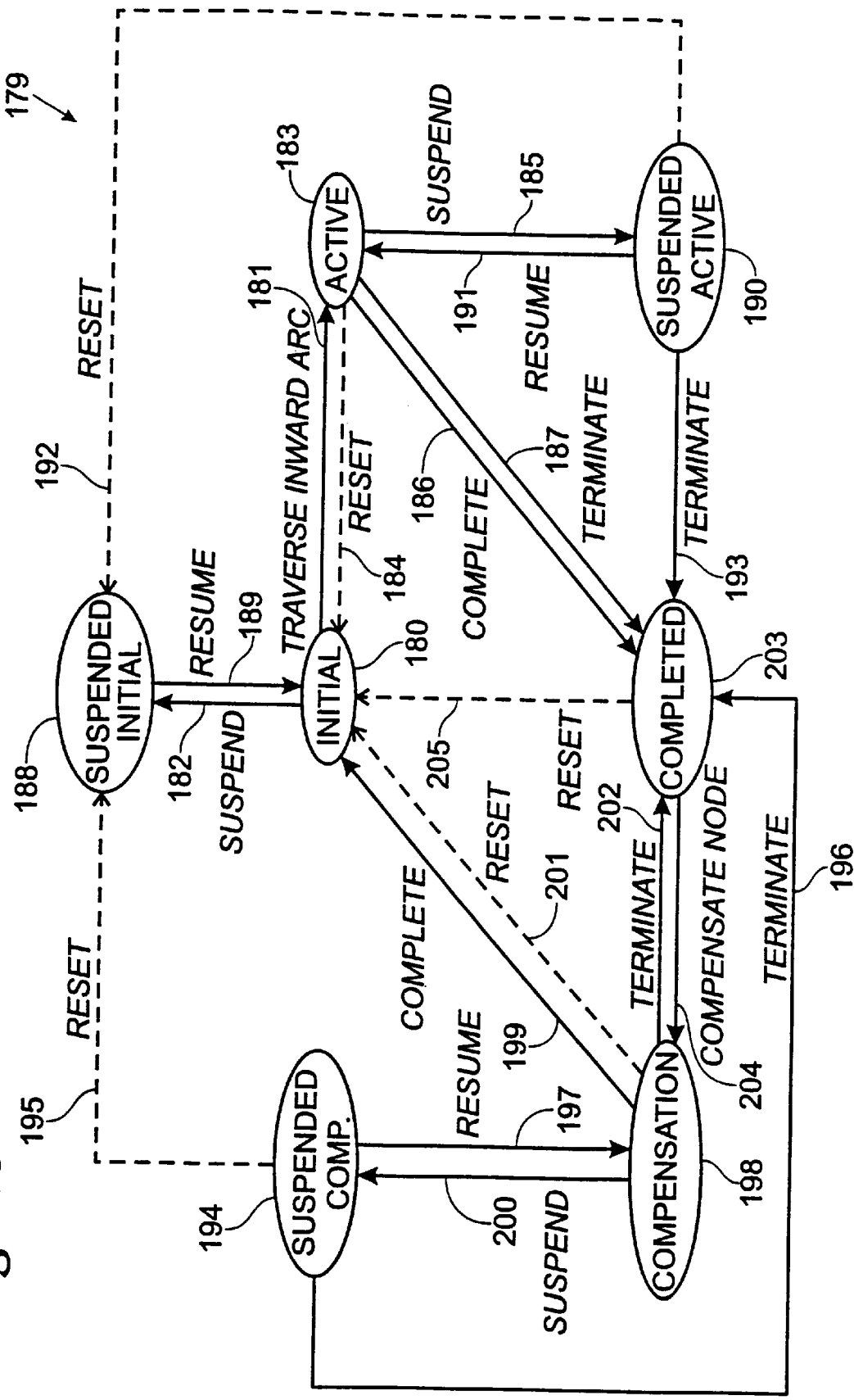
FIG. 10 shows the work node instance state machine for the work node instance manager for use with the workflow process software engine of FIG. 4.

FIG. 10 shows the work node instance state machine 179 for the WNIM for use with the workflow process software engine of FIG. 4. The work node instance state machine 179 has seven states, divided into four regular execution states: Initial 180, Active 183, Completed 203 and Compensation 198; and three suspended execution states: Suspended Initial 188, Suspended Active 190 and Suspended Compensation 194. The states are interconnected with directed arcs, each arc labeled with the message passed from the source state to the destination state.

In OpenPM, a process activity is represented as a generic activity. By definition, an activity is a logical unit of work that contributes towards the accomplishment of a workflow process. An activity can represent normal execution (process activity), a rollback operation (compensation activity) or termination (cancel activity). In the described embodiment, the activity definition is separated from its usage and all activities are defined in exactly the same way whereby each activity contains the following specifications:

(a) a resource specification;

(b) a compensation activity (can be NULL);

(c) a cancel activity (can also be NULL);

(d) a timeout specification, such as a time interval, or cancellation or compensation indicator; and (e) a fail handling specification for specifying whether compensation should occur.

An activity can be reused at different work nodes 141, 143. At runtime, the OpenPM engine 20 maps a resource specification to a physical business object 93*a*–*c* (shown in FIG. 5). Each business object 93*a*–*c* can be either an automated application, a manual process or an OpenPM subprocess.

The work node instance state machine 179 starts from an Initial 180 state. A work node 141 ends in a Completed state 203 if it either completes execution from an Active state 183 via a Complete arc 186 or is terminated from the Active state 183, a Suspended Active state 190, a Compensation state 198 or Suspended Compensation state 194 via a Terminate arc 187, 193, 202 or 196, respectively. A work node 141 in the Initial state 180 can enter the Active state 183 or a Suspended Initial state 188 via a Traverse Inward Arc 181 or a Suspend arc 182, respectively. A work node 141 in the Suspended Initial state 188 can enter the Initial state 180 via a Resume arc 189. A work node 141 in the Active state 183 can enter the Suspended Active state 190 via a Suspend arc 185. A work node 141 in the Suspended Active state 190 can resume execution by returning to the Active state 183 via a Resume arc 191. A completed work node 141 in the Completed state 203 can be compensated by the compensation manager by entering the Compensation state 198 via a Compensate Node arc 204. A work node 141 in the Compensation state 198 can enter the Initial state 180 via a Complete arc 199. A work node 141 in the Compensation state 198 can enter the Suspended Compensation state 194 via a Suspend arc 200. Likewise, a work node 141 in the Suspended Compensation state 194 can enter the Compensation state 198 via a Resume arc 197. Finally, an active work node 141 can be terminated once it has started execution, so long as it is not in the Initial 180 or Suspended Initial 188 states. An active work node 141 can also be terminated before it completes, so long as it is not in the Completed 203 state. A work node 141 is ready to run if it is in the Initial 180 state and can be reset to the Initial 180 or Suspended Initial 188 states from any other states by Reset arcs 184, 192, 195, 201 or 205.

In the OpenPM engine 20, each work node instance 141 has its own work node instance state machine 179 which is started when the inward arc from the Initial 180 state has been traversed. Once started, the work node instance state machine 179 moves into the Active 183 state and starts the activity instance state machine for the associated process activity, as further described below with reference to FIG. 11. Each work node instance state machine 179 can only be started from the Initial 180 state. After being completed, the work node instance state machine 179 will ignore all arcs except reset and compensation.

The work node instance state machine 179 moves to the Completed 203 state whenever it is in the Active 183 state and the associated activity instance state machine 209 (shown below in FIG. 11) has completed. The work node instance state machine 179 also moves to the Completed 203 state whenever it is not in the Initial 180 or Suspended Initial 188 states and has been requested by a user to terminate its execution. Responsive to the user termination request, the work node instance state machine 179 starts an activity instance state machine for a cancel activity for the associated process activity if the work node 141 is in the Active 183 or Suspended Active 190 states and a cancel activity has been defined for the active process activity. Alternatively, the work node instance state machine 179 starts an activity instance state machine for the cancel activity if the work node 141 is in the Compensation 198 or Suspended Compensation 194 states and a cancel activity has been defined for the compensation activity.

The work node instance state machine 179 moves to the Compensation 198 state only if it is in the Completed 203 state and has been requested by the PIM to compensate the associated work node 141. This situation occurs when another work node 143 has failed and the current work node 141 is in its compensation scope. When entering the Compensation 198 state, the work node instance state machine 179 starts an activity instance state machine for the compensation activity of the associated process activity.

Activity Instance State Machine

Figure 11:
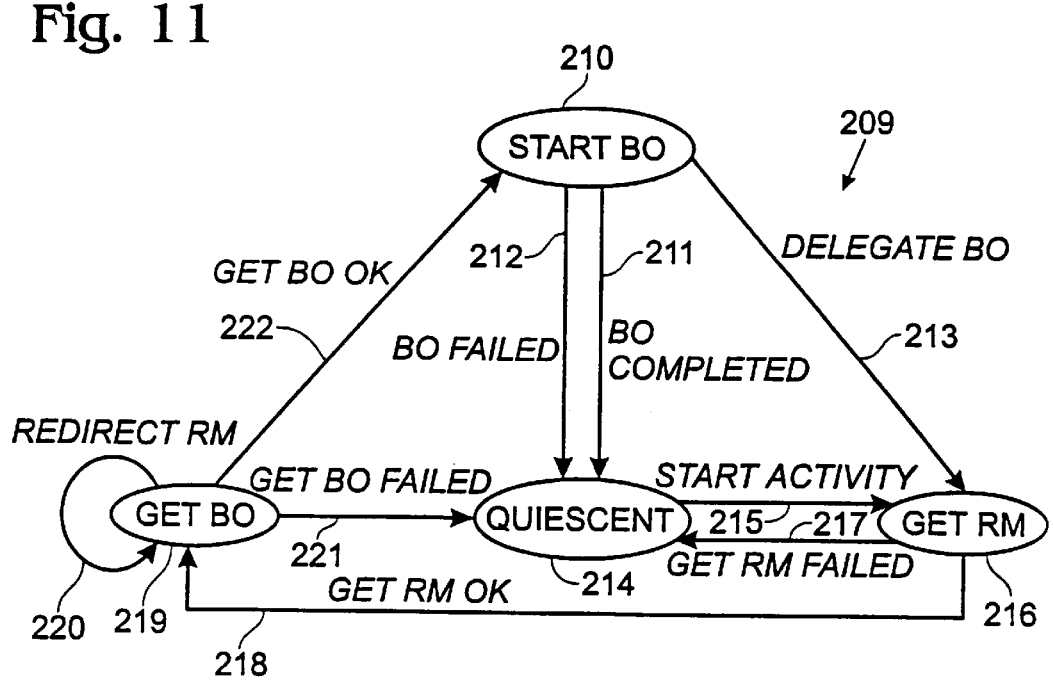
FIG. 11 shows the activity state machine for the activity instance manager for use with the workflow process software engine of FIG. 4.

FIG. 11 shows the activity state machine 209 for the AIM for use with the workflow process software engine of FIG. 4. The activity state machine 209 has four execution states: Start Business Object (Start BO) 210, Quiescent 214, Get Resource Mapping (Get RM) 216 and Get Business Object (Get BO) 219. The states are interconnected with directed arcs, each arc labeled with the message passed from the source state to the destination state. As described above with reference to FIG. 9, the major responsibility of a work node instance state machine 179 is starting state machines for associated process, compensation and cancel activities. Since all activities, including resource activities, have the same specification, the OpenPM engine 20 employs a generic activity state machine to execute all activities with a dedicated state machine for each particular activity.

There are three types of paths. Minimal normal activity execution paths start from the Quiescent state 214, go through the Get RM state 216 via a Start Activity arc 215, the Get BO state 219 via a Get RM OK arc 218 and the Start BO 210 state via a Get BO OK arc 222, and return back to the Quiescent state 214 via a BO Completed arc 211. The activity state machine 209 always returns along failure paths to the Quiescent state 214 via a BO Failed arc 212, Get BO Failed arc 221 or Get RM Failed arc 217 when failed and can fail at any of the states except the Quiescent state 214. The Redirect RM arc 220 is an optional execution path.

The activity state machine 209 also supports redirect resource mapping in the Get RM 216 state and can delegate applications in the Get BO 219 state via a Delegate BO arc 213. Redirect resource mapping is needed when the selected resource manager (not shown) recommends back to the OpenPM engine 20 that another resource manager is better suited for executing the job. The activity state machine 209 remains in the Get BO 219 state and contacts the new resource manager. Similarly, a business object 93a–c might suggest to the OpenPM engine 20 that another business object 93a–c is better suited for executing the job. The activity state machine 209, after receiving the business object delegation request from the business object 93a–c, contacts the resource manager for the new business object 93a–c.

During normal activity execution, the activity state machine 209 starts in the Quiescent state 214 and moves to the Get RM state 216 once started. The activity state machine 209 dispatches a resource manager (not shown) for the activity requested. The resource manager specification could be another activity. The state machine next moves to the Get BO state 219 if a valid resource manager has been found. The activity state machine 209 contacts the resource manager for business objects 93a–c that perform the activity. The state machine then moves to the Start BO state 210 to invoke the selected business object 93a–c. At this state, the OpenPM engine 20 can determine as the result of resource mapping which business objects 93a–c are capable of performing the requested job and how they can be invoked. The activity state machine 179 finally returns to the Quiescent state 214 until the business object 93a–c completes, either successfully or unsuccessfully.

In the Quiescent state 214, the activity state machine 214 performs a Post Action if the business object 93a–c completed successfully, a Fail Action if the previous execution failed or a Timeout Action if the previous execution timed out. A Post Action performs different functions based on the type of business object 93a–c. For example, if the activity is a cancel activity for a process activity, the activity state machine 214 sends a message to traverse the outward arc of the containing work node 143 so the activity state machine 209 for the next work node 144 can get started. However, if the activity is a compensation activity or a cancel activity for a compensation activity, the activity state machine 179 sends a message to the compensation manager (not shown) to inform it of the completion of the node compensation. Finally, if the activity is a resource mapping activity, the activity state machine 179 sends a message to the activity state machine 179 of the containing activity regarding the physical business objects 93a–c so that it can proceed with execution. After these actions have been performed, the activity state machine 179 immediately moves back to the Quiescent state 214 indicating the successful completion of the activity execution.

Fail Action and Timeout Action perform actions specified in the invoking activity's timeout and failure handling specifications, respectively. These actions include, for example, canceling the activity execution, compensating the process execution and so forth. Messages are sent to the work node instance state machine 179 (or the process instance state machine 159) to start a cancel activity state machine or compensation process. The activity state machine 179 also moves back to the Quiescent state 214, indicating unsuccessful completion of the activity execution.

Resource Mapping

Each activity has a resource specification consisting of two major parts: a role specification and a mapping specification. The role specification is a logical specification of the task performer specified by activity, such as programmer, accountant, ATM and so forth. The mapping specification can be one of the following: (1) a NULL value; (2) a specific resource manager; or (3) a resource mapping activity. A resource manager is a specialized OpenPM business object 93a that takes as input a role specification and an activity name, consults an organization directory containing resource information, business rules and policies, selects one or more capable business objects 93b–c and returns the selected business objects 93b–c to the OpenPM engine 20. The system default resource manager is used when the mapping specification is NULL. A process designer 22a–c (shown in FIG. 2) can also use a specific resource manager.

The purpose of the resource mapping activity is to choose the right resource manager for the role specification. The mapping allows a hierarchical resource specification. The resource managers are organized in a hierarchical fashion such that each resource manager works within the scope of the resource managers immediately below it in the hierarchy. During process definition, the process designer 22a–c only need know the topmost level resource manager in the hierarchy. Thus, the resource mapping activities automatically find the right resource manager and map the role specification into physical business objects 93a–c.

For example, assume two resource managers with one for technical staff and another for management staff. A resource mapping activity can be implemented such that the resource manager knows which of the other resource managers understand a specific type of role specification. Suppose the role specification of an process activity requires the services of a programmer and the mapping specification is the above defined activity. At runtime, when the activity is invoked with the role specification, it returns to the activity state machine 209 containing the activity in question the resource manager that manages the technical staff which will then check the technical staff directory to select a capable programmer that is available to perform the process activity.

Redirected Resource Mapping

The purpose of resource mapping is to map a logical specification of each resource to a specific resource, such as a user 14a, machine 15a or microprocessor-controlled device 16 (each shown in FIG. 1). Although the process of performing specific resource mapping might need additional information, such as a meeting time or place, the number of people expected to attend and so forth, two pieces of information are common to all resource mapping functions: a task name and a resource role. The task name specifies the task to perform, such as scheduling a meeting. The resource role defines a logical specification of the resource capable of performing the task, such as administrative assistance.

Resource mapping is performed by a resource manager 28a (shown in FIG. 5). The OpenPM engine 20 sends to the resource manager 28a a message requesting a mapping, including a task name, resource role and other pertinent information. If the resource manager 28a can understand the task name, resource role and other information, the resource manager 28a performs the requested mapping and replies to the OpenPM engine 20 with a specific resource.

The resource manager 28a might not possibly understand all of the mapping requests. For example, a resource manager 28a for engineers might not understand a task named "schedule meeting" or a resource role of "Administrative Assistance." When this happens, the OpenPM engine 20 allows the resource manager 28a to do two things:

(1) Reply back to the OpenPM engine 20 with a "do not understand" message; or (2) Reply back to the OpenPM engine 20 with a "try resource manager B" message.

The first form of reply simply rejects the requested mapping. The second form of reply informs the OpenPM engine 20 that the requested resource manager 28a does not know how to perform the requested mapping and suggests an alternate resource manager 28b. In response, the OpenPM engine 20 can either choose the suggested alternate resource manager 28b or try another resource manager 28c.

Application Delegation

At run time, a resource manager can also map a role specification and an activity name onto a physical business object 93a–c not capable of or not available to perform the job. The OpenPM engine 20 allows the business object 93a–c to reject the task and suggest a different (logical) role or (physical) business object 93a–c.

In the previous example, suppose the resource manager mapped the role specification (programmer) and the activity to a business object 93a named Bob. If Bob is too busy, he may suggest the services of another programmer named Mary. If she is not capable of doing the job, Bob can even suggest to the OpenPM engine 20 a new role, such as designer. If the current business object 93a suggests another business object 93b of the same role, the activity state machine 209 will not leave the current Start BO state 210, but will instead simply invoke or delegate the application to the new business object 93b. If a new role is suggested, the activity state machine will move back to the Get BO state 219 to map it to physical business objects 93a–c.

Rule Node Instance State Machine

Figure 12:
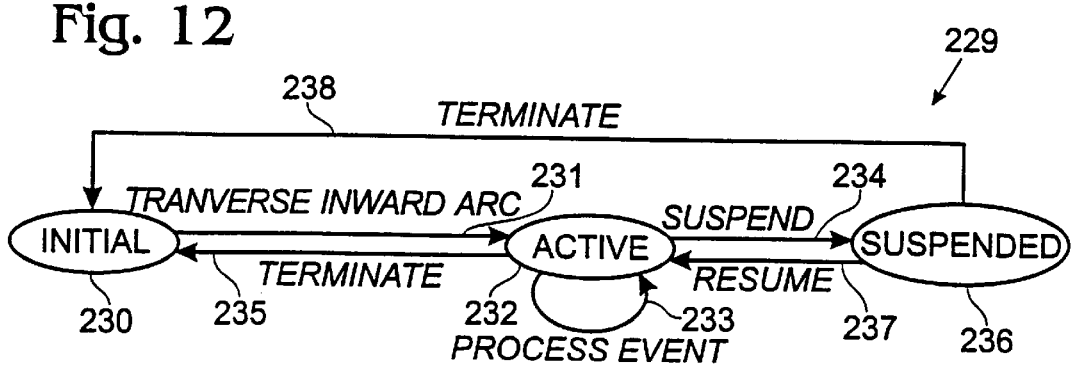
FIG. 12 shows the rule node instance state machine for the rule node instance manager for use with the workflow process software engine of FIG. 4.

FIG. 12 shows the rule node instance state machine 229 for the RNIM for use with the workflow process software engine of FIG. 4. The rule node instance state machine 209 has three execution states: Initial 230, Active 232 and Suspended 236. The states are interconnected with directed arcs, each arc labeled with the message passed from the source state to the destination state. Each rule node 142 (shown in FIG. 8) has one or more inward (forward and reset) arcs, zero or more outward (forward and reset) arcs and one or more rule specifications. A rule can be specified based on the run time information, such as the timing and status of each inward arc, the types of each inward arc (forward or reset) or the process-relevant data associated with the process instance.

A rule node 142 is started whenever one of its inward arcs has been traversed. Rules defined in the rule node 142 will then be evaluated by the OpenPM engine 20. Rules in the rule node 142 are also evaluated when one of the events to which it subscribes occurs. Generally, a rule, if evaluated to be TRUE, does one of the following:

(a) Fires one or more of its outward arcs;

(b) Changes the rule node instance status;

(c) Changes data in the Case Packet;

(d) Subscribes to or unsubscribes from events; or (e) Raises events.

A rule node 142 either can be for routing (route node) or event processing (event node). Route nodes do not subscribe and raise events whereas event nodes do.

The rule node instance state machine 229 of each rule node 142 starts from the Initial state 230 and moves to an Active state 232 via a Transverse Inward Arc 231. The rule node instance state machine 229 remains in the Active state 232 even after its outward arcs have been fired. In the Active state 232, a rule node 142 reacts to the events to which it has subscribed via a Process Event arc 233. The rule node 142 can move to the Suspended state 236 via a Suspend arc 234 either explicitly in response to a user request or implicitly when the process instance is suspended. In the Suspended state 236, the rule node 142 can move to the Active state 232 via a Resume arc 237. The rule node 142 can be terminated via a Terminate arc 235, 238 by being unsubscribed from all previously subscribed events. Reset arcs have no effect rule nodes 142.

To summarize, workflow processes involve the coordinated execution of activities performed by workflows, such as a user 14a–b, a machine, instrument 15a–b or microprocessor controlled device 16 (all shown in FIG. 1). Each workflow process is executed by one or several coordinated WFPM systems 12a–d which step through the process definition and invoke workflows to perform the process activities. Workflow management subsystems (resource managers) in the WFPM systems assign resources to workflow activities when needed. A workflow process is collectively run by four log-based and efficient state machines: a process instance state machine 179; rule node instance state machine 179; work node instance state machine 229; and activity instance state machine 209.

Flexibility is achieved in several ways. First, the process instance state machine 179 supports three different forms of process instantiation: immediate instantiation; lazy instantiation; and hybrid instantiation. Different instantiation approaches can be used for efficient process execution, runtime process modification or both. Second, the activity instance state machine 209 allows flexible resource assignment, such as multilevel, hierarchical resource assignment via resource activities and resource manager redirection. Third, the activity instance state machine 209 also allows flexible application execution by supporting application delegation. A workflow not capable of performing an assigned activity can delegate the work to other more capable resources, thereby avoiding unnecessary failures and excess execution overhead for recover and compensation.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A system for performing flexible workflow process in a distributed workflow management system that includes multiple computers, comprising:

a workflow process management system operating on at least one of the computers to control execution of the workflow process which includes process instances;

a plurality of resources coupled to respective ones of the computers to carry out the process instances;

a plurality of state machines that comprise a process instance state machine that includes a plurality of states including (1) a compensation state that allows a failed process instance at a work node to be compensated such that resumption of execution of the failed process instance can be from a specified end compensation point, and (2) a suspended compensation state that allows the process instance in the compensation state to move to the suspended compensation state when the process instance becomes suspended;

a work node instance state machine for a work node instance manager that manages work nodes of the workflow process, wherein the work node instance state machine includes a plurality of states including the compensation state and the suspended compensation state; and a rule node instance state machine for a rule node instance manager that manages rule nodes of the workflow process.

2. A system according to claim 1, wherein the work node instance state machine, further comprises:

an initial state logically coupled to an active state via a traverse inward arc and to a suspended initial state via a suspend arc;

the suspended initial state logically coupled to the initial state via a resume arc;

the active state logically coupled to a completed state via a complete arc and a terminate arc, and to the suspended active state via a suspend arc;

the suspended active state logically coupled to the active state via a resume arc and to the completed state via a terminate arc;

the completed state logically coupled to the compensation state via a compensate node arc;

the compensation state logically coupled to the completed state via a terminate arc, to a suspended compensation state via a suspend node and to the initial state via a complete arc; and the suspended compensation state logically coupled to the compensation state via a resume state to the completed state via a terminate arc.

3. A system according to claim 2, further comprising:

the active state logically coupled to the initial state via a reset arc;

the suspended active state logically coupled to the suspended initial state via a reset arc;

the suspended compensation state logically coupled to the suspended initial state via a reset arc;

the completed state logically coupled to the initial state via a reset arc; and the compensation state logically coupled to the initial state via a reset arc.

4. A system according to claim 1, wherein at least one of the state machines comprises an activity instance state machine, comprising:

a start business object (BO) state logically coupled to a quiescent state via a BO failed arc and a BO completed arc and to a get resource manager (RM) state via a delegate BO arc;

the quiescent state logically coupled to the get RM state via a start activity arc;

the get RM state logically coupled to the quiescent state via a get RM failed arc and to a get BO state via a get RM okay arc; and the get business object state logically coupled to the quiescent state via a get BO failed arc, to the start BO state via a get BO okay arc and to itself via a redirect RM arc.

5. A system according to claim 1, wherein the rule node instance state machine, further comprises:

an initial state logically coupled to an active state via a traverse inward arc;

the active state logically coupled to the initial state via a terminate arc, to a suspended state via a suspend arc and to itself via a process event arc; and the suspended state logically coupled to the initial state via a terminate arc and to the active state via a resume arc.

6. The system of claim 1, wherein the process instance state machine is started and managed by a process instance manager.

7. The system of claim 6, wherein when the process instance state machine for the process instance is in the compensation state, the process instance manager saves all currently active work nodes of the process instance;

sends a message and relevant information to a compensation manager.

* * * * *